United States Patent [19]

Calvin

[11] Patent Number: 4,475,699
[45] Date of Patent: Oct. 9, 1984

[54] LEADER DISPENSER

[76] Inventor: Larry A. Calvin, 907 Iowa, Belgrade, Mont. 59714

[21] Appl. No.: 404,623

[22] Filed: Aug. 2, 1982

[51] Int. Cl.³ ............................................. B65H 59/38
[52] U.S. Cl. ................................ 242/137.1; 242/156.2
[58] Field of Search .................. 242/129.5, 129.8, 134, 242/136, 137, 137.1, 149, 150 R, 156, 156.2; 223/106–109; 43/54.5 R

[56] References Cited

U.S. PATENT DOCUMENTS

| | | | |
|---|---|---|---|
| 1,070,611 | 8/1913 | Jones | 242/137 |
| 2,226,430 | 12/1940 | Handzelek | 242/137 |
| 4,141,479 | 2/1979 | Dennison | 242/137.1 X |
| 4,279,389 | 7/1981 | Thomas | 242/156.1 |

Primary Examiner—Leonard D. Christian
Attorney, Agent, or Firm—Richard C. Conover

[57] ABSTRACT

A leader dispenser having a housing for holding multiple leader spools. A coil spring is used to resiliently bias the spool into frictional engagement with an element for braking rotational movement of the spool thereby preventing free wheeling of the spool when leader is drawn from the spool. This spring also acts to resiliently force two washer-like elements together. The leader is directed between these two washer-like elements whereby the washers grip the leader between them preventing the leader from being drawn back into the housing after a length of leader is cut from the leader on the spool.

7 Claims, 5 Drawing Figures

LEADER DISPENSER

BACKGROUND OF INVENTION

This invention relates to leader dispensers and in particular to leader dispensers having a housing for holding multiple leader spools. This dispenser is designed to prevent the leader from being withdrawn back into the housing after a length of leader is cut from the leader spool and to prevent free wheeling of the leader spool when the leader is being drawn out of the housing from the spool.

Leader dispensers are used in the fishing field to carry multiple spools where otherwise the spools would have to be carried loose and individually. Each of the spools carry leaders of different weight or size and the dispenser provides a convenient package for carrying and dispensing the leader from the spools.

Leader dispensers are known in the art. U.S. Pat. No. 4,026,063 to Allen et al. describes a leader dispenser for a plurality of wound spools having a housing which defines a plurality of spool compartments each holding a single spool. A spool is mounted on a post in each compartment. There is an outlet opening from a sidewall in each compartment to permit the leader to be drawn from the spool out of the compartment. In the outlet opening is provided an insert of rubber or soft plastic material having a central slit through which the leader is drawn. This resilient material grips the leader and prevents the inadvertent withdrawal of the leader back into the compartment.

The leader dispenser described by Dennison in U.S. Pat. No. 4,141,479 includes a housing in which a plurality of spools are mounted. Each spool has a central aperture which is mounted on an upright post. The dimensions of the aperture and post are selected so that the spool is frictionally restricted from free rotation. Leader is drawn from the spool outside the housing through a hole in the wall of the housing.

U.S. Pat. No. 2,517,866 to Glahn describes a leader dispenser in which a spring acts on a series of fingers to press against the periphery of leader spools so as to exert a braking action thereon. A compartment separate from the leader spool compartment is provided for holding miscellaneous materials such as other leaders or flies.

BRIEF SUMMARY OF THE INVENTION

The present invention is an improvement over the leader dispensers known in the art. The present invention includes a housing for conveniently carrying multiple spools for holding leaders of various sizes and weights. The housing also includes a separate compartment for holding miscellaneous items. The unique design of the present invention provides structure for preventing the withdrawal of leaders back into the housing when a length of leader is cut from the spool and provides structure for preventing free wheeling of the spool on its mounting post when leader is being drawn from the spool. The present invention is durable and is resistant to wear caused by leader being drawn from the spool out of the housing.

The leader dispenser according to the present invention includes a spring which resiliently biases the spool into frictional engagement with an element for braking the spool when leader is being drawn therefrom. This same spring also resiliently forces two washer-like elements together. The leader is directed between these two washer-like elements before it is directed out of the housing. These two washers act to grip the leader between them thereby preventing the leader from being drawn back into the housing. This structure overcomes the natural tendancy of coiled monofilament leader to recoil to its previous position when being drawn from a spool.

BRIEF DESCRIPTION OF THE DRAWINGS

In order that the invention may be clearly understood and readily carried into effect, a preferred embodiment will now be described, by way of example only, with reference to the accompanying drawings wherein.

DESCRIPTION OF A PREFERRED EMBODIMENT

Figure 1:
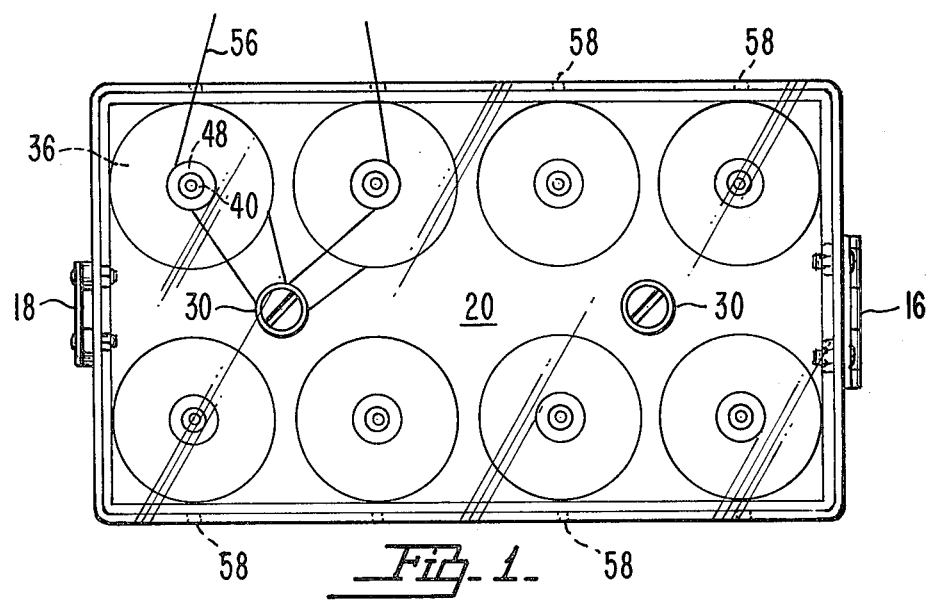
FIG. 1 is a plan view of the leader dispenser according to the present invention.
Figure 2:
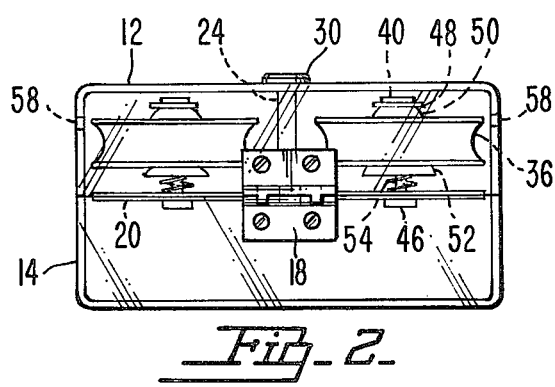
FIG. 2 is a left side elevational view of the leader dispenser shown in FIG. 1.
Figure 3:
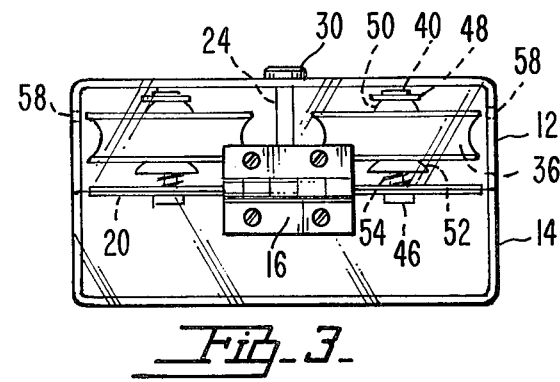
FIG. 3 is a right side elevational view of the leader dispenser shown in FIG. 1.
Figure 4:
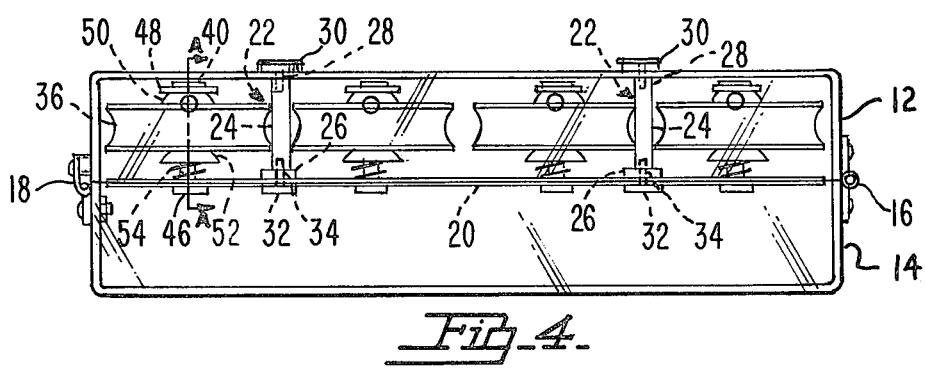
FIG. 4 is a front elevation view of the leader dispenser shown in FIG. 1.
Figure 5:
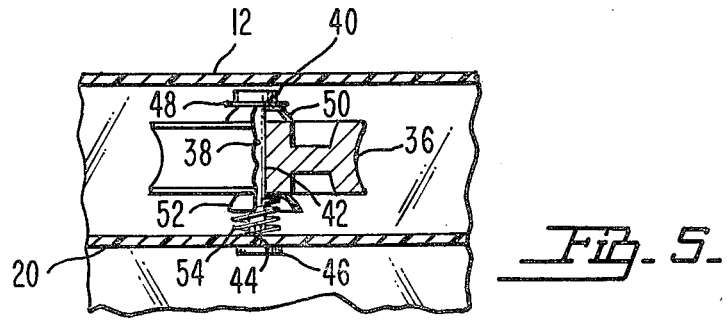
FIG. 5 is a partial view shown partially in section along line A—A in FIG. 4.

The leader dispenser shown in FIGS. 1-4 includes a top housing portion 12 and a bottom housing portion 14 as shown in FIGS. 2-4. The top housing portion 12 and bottom housing portion 14 are preferably constructed of transparent material to provide easy viewing of the contents of this housing. The top housing portion 12 has a top wall, two opposed side walls and two opposed end walls, and similarly bottom housing portion 14 has a bottom wall, two opposed side walls and two opposed end walls. A hinge 16 is provided at one end of the housing hingedly joining adjacent end walls of the top and bottom housing portions 12 and 14 respectively. At the opposite end of the housing, a clasp 18 is provided to releasably join adjacent end walls of the top and bottom housing portions 12 and 14, respectively.

A base panel 20 is mounted to the top wall of top housing portion 12 in spaced apart opposing relation to this top wall with binding posts 22. Each of these binding posts 22 includes a post 24 with a head 26 integrally formed thereon. A screw 30 is threadably received by post 24 through aperture 28. Another screw 32 extends through an aperture 34 in base panel 20 and is threadably received by post 24.

Leader spools 36 are mounted on the base panel 20 between the base panel 20 and the top wall of top housing portion 12. Each of the leader spools 36 are mounted on a post 38 having a head 40 integrally formed thereon. Each leader spool 36 has a central aperture 42 for mounting the spool 36 on post 38. A screw 46 is threadably received by post 38 through aperture 44 in base panel 20.

On the post 38 and between the head 40 of post 38 and spool 36 are mounted a flat washer 48 and a finish washer 50 with the cup facing toward spool 36. On the post 38 and between the spool 36 and the base panel 20 are mounted a finish washer 52 with the cup facing toward base panel 20 and a coil spring 54 mounted in surrounding relation to post 38.

With this arrangement the spring 54 resiliently biases the finish washer 52, the spool 36, the finish washer 50, the flat washer 48 against head 40 of post 38. The force of the spring 54 may be adjusted by loosening or tightening the screw 46 which is in threadable engagement with post 38.

Leader 56 wound on each spool 36 is directed around a binding post 24, then between the flat washer 48 and finish washer 50 and then out of the top housing portion 12 through an aperture 58 as shown in FIG. 1.

The spring 54 in the present invention performs two functions. By providing resilient pressure on the spool 36, the spool 36 is prevented from freely rotating. Further, by providing resilient pressure between the finish washer 50 and flat washer 48 between which the leader 56 is drawn, the leader is gripped by the flat washer 48 and finish washer 50 to prevent withdrawal of the leader into the top housing portion after the leader is drawn from the spool outside the top housing portion.

It is contemplated that labels will be placed on the heads 40 to identify the type of leader on each spool. Thus it will be a simple matter to select the type of leader described, draw the leader from the housing and cut off the length desired.

The bottom housing portion 14 provides a convenient container for holding extra leaders, flies, lures or other miscellaneous items.

While the fundamental features of the invention have been shown and described, it should be understood that various substitutions, modifications and variations may be made by those skilled in the art without departing from the spirit or scope of the invention. Accordingly, all such modifications and variations are included within the scope of the invention as defined by the following claims.

I claim:

1. A dispenser for dispensing leader comprising:
   a housing portion having walls defining an interior space;
   a base panel mounted in the interior space;
   an axle mounted on the base panel;
   a leader spool for holding leader, the leader spool being mounted on the axle;
   the axle having a head portion with the leader spool being mounted between the head portion and the base panel and the head portion being dimensioned to prevent the leader spool from being removed from the axle;
   resilient means associated with each leader spool for frictionally engaging the leader spool to prevent the leader spool from free wheeling on the axle;
   gripping means associated with the resilient means and actuated thereby for gripping leader extending through such gripping means;
   the leader on a leader spool being directed through the gripping means and then out of the interior space through a corresponding aperture provided in a wall of the housing.

2. The dispenser according to claim 1 further including means for adjusting the biasing force of the resilent means.

3. A dispenser for dispensing leader comprising:
   a top open box housing portion having a top wall, a pair of opposed end walls and a pair of opposed side walls;
   a bottom open box housing portion having a bottom wall, a pair of opposed end walls and a pair of opposed side walls;
   hinge means for hingedly connecting the top and bottom housing portions along adjacent edges of corresponding end walls;
   means for releasably connecting the top and bottom housing portions along adjacent edges of corresponding end walls opposite the end walls hingedly connected whereby the top housing and bottom housing portions being connected define an interior space;
   a base panel mounted in the interior space to the top wall in spaced apart parallel relation, therewith, by supporting posts;
   an axle mounted on the base panel;
   a leader spool for holding leader being mounted on the axle;
   the axle having a head portion with the leader spool being mounted between the head portion and the base panel and the head portion being dimensioned to prevent the leader spool from being removed from the axle;
   a first washer mounted on the axle between the head portion of the axle and the leader spool;
   a second washer mounted on the axle between the head portion of the axle and the leader spool;
   resilient means for resiliently biasing the leader spool and the first and second washers against the head portion of the axle;
   the leader on the leader spool being directed from the leader spool around a portion of a supporting post then between the first and second washers associated with the leader spool and then out of the interior space through a corresponding aperture provided in the side wall of the top housing portion.

4. The dispenser according to claim 3 wherein the the resilient means comprises a coiled spring mounted in surrounding relation with the axle between the leader spool and the base panel with the axis of the coiled spring coinciding with the axis of the axle.

5. The dispenser according to claim 4 further having a third washer mounted on the axle between the leader spool and the coiled spring.

6. The dispenser according to claim 3 wherein the walls of the top and bottom housing portions are constructed of transparent materials.

7. A dispenser for dispensing leader comprising:
   a housing portion having walls defining an interior space;
   an axle mounted to the housing portion within the interior space;
   a leader spool for holding leader and positioned within the interior space, the leader spool being mounted on the axle;
   resilient means associated with the leader spool for frictionally engaging the leader spool to prevent the leader spool from free wheeling on the axle;
   gripping means associated with the resilient means and actuated thereby for gripping leader extending through such gripping means;
   the leader on a leader spool being directed through the gripping means and then out of the interior space through a corresponding aperture provided in a wall of the housing.

* * * * *